Jan. 9, 1934.

J. GRISON

Re. 19,043

MASSAGING DEVICE

Original Filed April 30, 1930

INVENTOR

Joseph Grison

BY

Fred C. Fischer

ATTORNEY

Reissued Jan. 9, 1934

Re. 19,043

UNITED STATES PATENT OFFICE 19,043

MASSAGING DEVICE

Joseph Grison, New York, N. Y.

Original No. 1,782,005, dated November 18, 1930, Serial No. 448,476, April 30, 1930. Application for reissue December 7, 1931. Serial No. 579,585

2 Claims. (Cl. 128—62)

This invention relates to massaging devices and more particularly to a device for simultaneously massaging and applying heat to the skin.

Facial beautification represents an important item in the life of women of today, and accordingly numerous cosmetics have been produced for such a purpose.

However, the usual cosmetics are objectionable in that they impart an artificial beauty to the face, and their ultimate effects are harmful in many instances.

It is an object of this invention to provide a massaging device which causes a natural beautifying glow in the face without harmful effects.

A further object is the provision of a simple massaging device for applying heat locally to the skin, which is so arranged that it may be conveniently grasped by the operator and readily manipulated to reach the surfaces of the skin to which heat is to be applied.

Another object is to so construct the device that it may be heated by the usual house supply of electric current and a gentle heat maintained thereby which does not rise to a point where there is any danger of burning the skin. This heat, while evenly distributed to the face of the device, does not pass to the back of the instrument or handle, which is maintained cool.

These and other advantageous objects, which will later appear, are accomplished by the simple and practical construction and arrangement of parts hereinafter described and exhibited in the accompanying drawing, forming part hereof, and in which.

Figure 1:
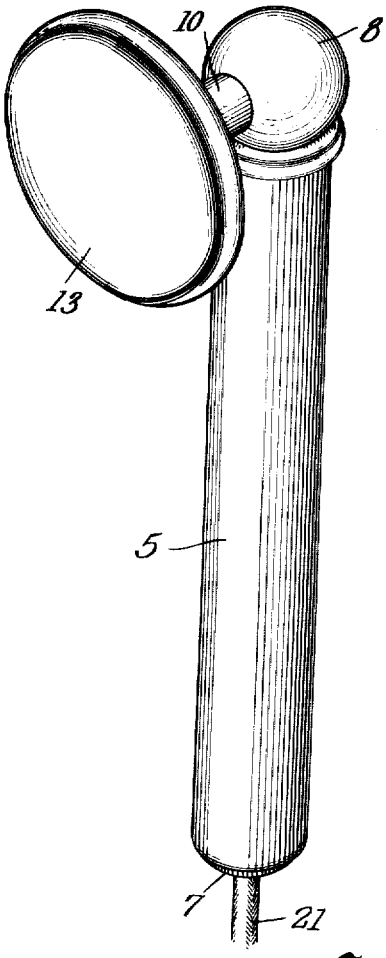
Figure 1 represents a perspective view of the device.

Referring to the drawing, the device is shown to include a handle 5, made preferably of insulating material, said handle having a central passage 6 through which passes electrical conducting cord 21. The lower end of the handle is provided with a nut 7 and the upper end of the handle has a spherical head 8 threaded thereon at 9.

Threaded into the head 8 at 11, and at right angles to the handle 6, is short tube 10, fixed at the opposite end to an apertured disc 12, which is connected at 14 to a flat circular casing having a polished outer face 13.

Juxtaposed to the inner surface of face 13 are a plurality of mica discs 15, of which an intermediate disc 16 is provided with a plurality of bands 20 of a platinum alloy, the center band being connected to terminal 18 of an electrical conductor and the outer band being connected to the terminal 19 of the other conductor, the conductors being carried by the cord 21 through tube 10 and handle 5 to a source of electrical current.

Interposed between the mica discs 15 and the inner surface of disc 12 is a quantity of non-heat conducting insulating material 17 such as asbestos.

It will be noticed that the bands 20 are not complete circles, but are each interrupted by the radial insulating mica space 22, so that the current will flow around one band until the space 22 is reached, at which time the current passes to the adjacent band 20 on the same side of space 22 and flows in the opposite direction.

The platinum alloy is deposited upon the mica disc by any suitable means, and the bands 20 are formed by scraping the insulating spaces 22, 23.

In application, the user applies a cream to the face, and after the latter has been worked into the skin, the massaging device is applied with the surface 13 contacting the skin. The surface 13 is given a rotary movement without moving the skin.

Figure 2:
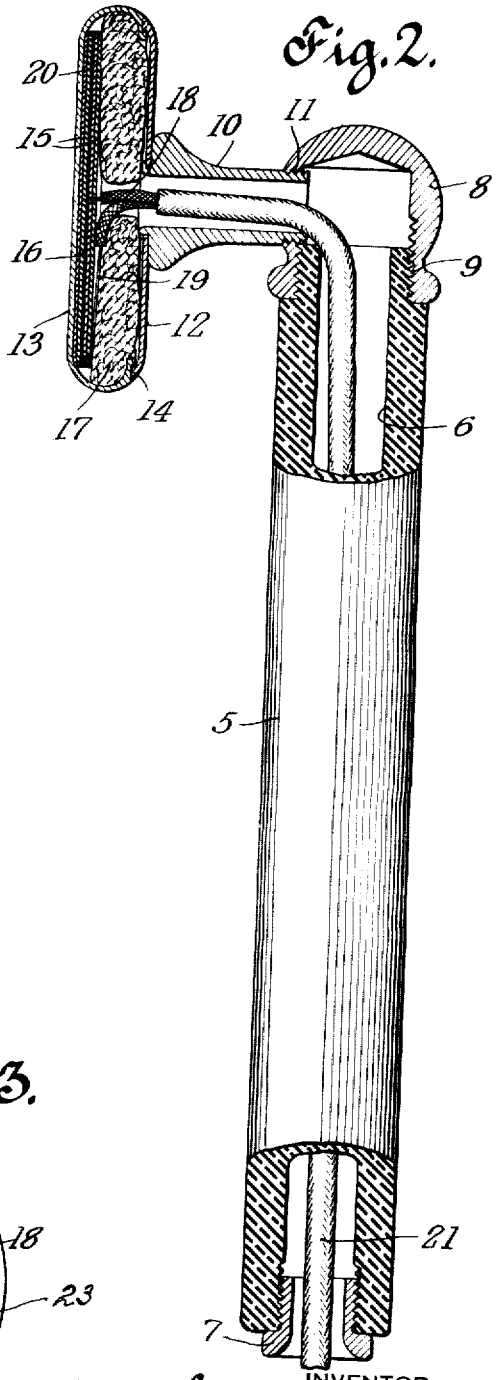
Figure 2 represents an enlarged sectional view of the device.
Figure 3:
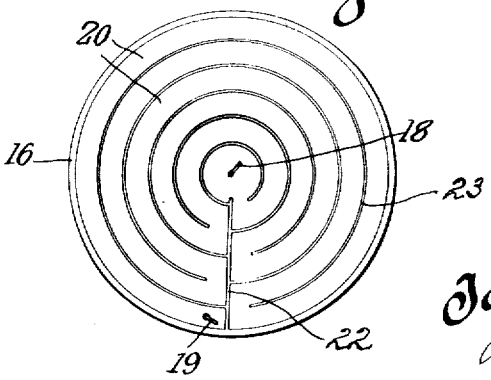
Figure 3 represents a plan view of a heating element in the device.

It will be noticed, from Figures 2 and 3, that the heating device, arranged to distribute heat evenly to the metal face, stands close to that face and comparatively distant from the back of the head, being maintained in that position by the interposed insulation, which is of annular form, leaving a central space for the passage of the electric conductors. This central space, and the bore of the handle and connecting elbow, provide a continuous passage from the interior of the head. It results from this construction that the heat is concentrated at the operating face of the instrument, while the back of the head and all other parts are kept cool.

The heat generated is not excessive and there is no danger of burning the face. It will be readily seen that the delicate application of heat with a cosmetic cream will impart to the skin a natural glow which is not usually attained by the usual manual massaging operations.

Also, when used with alternating current, a faint vibrating effect is created, the vibrations, of course, being dependent upon the frequency of the current.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. A massaging device, comprising a flat metal casing, a plurality of discs of insulating material positioned in the casing, a plurality of interrupted bands of conducting material deposited on one of the discs, each of said bands being connected at its ends to adjacent bands, means for supplying electrical current to the bands, said bands being distributed to apply heat evenly to one flat wall of the casing, and a packing of insulating material interposed between the discs and the opposite wall to maintain the discs firmly against the wall being heated.

2. A massaging device, comprising a flat metal casing, a plurality of discs of insulating material positioned in the casing, a plurality of bands of fine gauge conducting material deposited on one of the discs, said bands being distributed to apply a gentle heat evenly to one flat wall of the casing, a packing of insulating material interposed between the discs and the opposite wall to maintain the discs firmly against the wall being heated, and means for supplying electrical current to the bands.

JOSEPH GRISON.

CERTIFICATE OF CORRECTION.

Reissue No. 19,043. January 9, 1934.

JOSEPH GRISON.

It is hereby certified that the above numbered patent was erroneously issued to the inventor said "Grison" whereas said patent should have been issued to Nance Varady, Inc., Cleveland, Ohio, a corporation of Ohio, as assignee of the entire interest in said invention as shown by the records of assignments in this office; and that the said Letters Patent should be read with this correction therein that the same may conform to the record of the case in the Patent Office.

Signed and sealed this 6th day of February, A. D. 1934.

F. M. Hopkins (Seal) Acting Commissioner of Patents.